United States Patent
Baumann et al.

[11] Patent Number: 6,050,477
[45] Date of Patent: Apr. 18, 2000

[54] METHOD OF BRAZING DIRECTIONALLY SOLIDIFIED OR MONOCRYSTALLINE COMPONENTS

[75] Inventors: Robert Baumann, Klingnau; Bernhard Fritsche, Winterthur, both of Switzerland

[73] Assignee: Asea Brown Boveri AG, Baden, Switzerland

[21] Appl. No.: 09/050,901

[22] Filed: Mar. 31, 1998

[30] Foreign Application Priority Data

Apr. 8, 1997 [DE] Germany ............................ 197 14 530

[51] Int. Cl.⁷ ............................ B23K 31/00; B23K 35/12
[52] U.S. Cl. ...................... 228/119; 228/234.1; 228/250; 228/245
[58] Field of Search ...................... 228/119, 245, 228/250, 193, 194, 234.1, 222, 46

[56] References Cited

U.S. PATENT DOCUMENTS

| | | | |
|---|---|---|---|
| 3,632,319 | 1/1972 | Hoppin et al. | 228/194 |
| 3,678,570 | 7/1972 | Paulonis et al. | 228/194 |
| 4,851,188 | 7/1989 | Schaefer et al. | 419/9 |
| 5,118,028 | 6/1992 | Ogawa et al. | 228/194 |
| 5,304,039 | 4/1994 | Corderman et al. | 416/241 R |
| 5,584,428 | 12/1996 | Satoh et al. | 228/194 |
| 5,666,643 | 9/1997 | Chesnes et al. | 428/549 |
| 5,699,955 | 12/1997 | Shimizu et al. | 228/194 |
| 5,732,467 | 3/1998 | White et al. | 29/889.1 |
| 5,822,852 | 10/1998 | Bewlay et al. | 29/889.1 |
| 5,846,057 | 12/1998 | Ferrigno et al. | 416/241 R |

FOREIGN PATENT DOCUMENTS 2267244  12/1993  United Kingdom.

Primary Examiner—Patrick Ryan
Assistant Examiner—Kiley Stoner
Attorney, Agent, or Firm—Burns, Doane, Swecker & Mathis, L.L.P.

[57] ABSTRACT

In a method of brazing directionally solidified or monocrystalline components, the brazing deposit and the directionally solidified or monocrystalline component are moved through a heated zone. In this zone, the temperature applied by a heating system is greater than the liquidus temperature of the brazing alloy and less than the local incipient melting temperature of the component. A thermal gradient is applied between the component and the brazing deposit.

12 Claims, 3 Drawing Sheets

METHOD OF BRAZING DIRECTIONALLY SOLIDIFIED OR MONOCRYSTALLINE COMPONENTS

BACKGROUND OF THE INVENTION

1. Field of the Invention

The invention starts from a method of brazing directionally solidified or monocrystalline components.

2. Discussion of Background

Welding and brazing are the commonest methods of restoring contours and of joining gas-turbine components which are produced by a casting process in a conventional manner. Due to higher efficiencies and thus higher turbine-inlet temperatures of the gas turbines, however, components which have better material properties at higher temperatures have become necessary. This can be achieved by improved materials or by directionally solidified or monocrystalline components. These materials or components are difficult to weld; therefore it has been attempted to repair such components by brazing. By fine-gap brazing with a gap width of less than 0.1 mm, it was possible to partly obtain the properties of the parent material in the applied material. At gap widths of greater than 0.1 mm, however, only low mechanical strength values of the applied brazing deposit could be produced in components solidified in a directional and monocrystalline manner.

SUMMARY OF THE INVENTION

Accordingly, one object of the invention, in a method of brazing directionally solidified or monocrystalline components of the type mentioned at the beginning, is to apply brazing deposit to components solidified in a directional and monocrystalline manner or to join such components.

This is achieved according to the invention by moving the brazing alloy deposit and the directionally solidified or monocrystalline component through a heated zone wherein the brazing alloy deposit is heated above its liquidus temperature but below the incipient melting point of the component while maintaining a thermal gradient between the component and the brazing alloy deposit.

The essence of the invention is therefore that the brazing deposit and the directionally solidified or monocrystalline component are moved through a heated zone, that, in this zone, the temperature applied by a heating system is greater than the liquidus temperature of the brazing alloy and less than the local incipient melting temperature of the component, i.e. that partial melting of the component does not occur, and that a thermal gradient is applied between the component and the brazing deposit.

The advantages of the invention may be seen, inter alia, in the fact that the physical and chemical properties of the brazing deposit are similar to the parent material solidified in a directional and monocrystalline manner. Furthermore, the brazing deposit has very much lower porosity than a conventional brazing deposit. In addition, the life costs of the components solidified in a directional and monocrystalline manner are increased by the possibility of applying directionally solidified brazing deposit.

The strength of the parent material is achieved by the brazing. Furthermore, repairs to highly stressed parts (such as turbine blades, blade platforms, etc.) can be carried out by this brazing method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
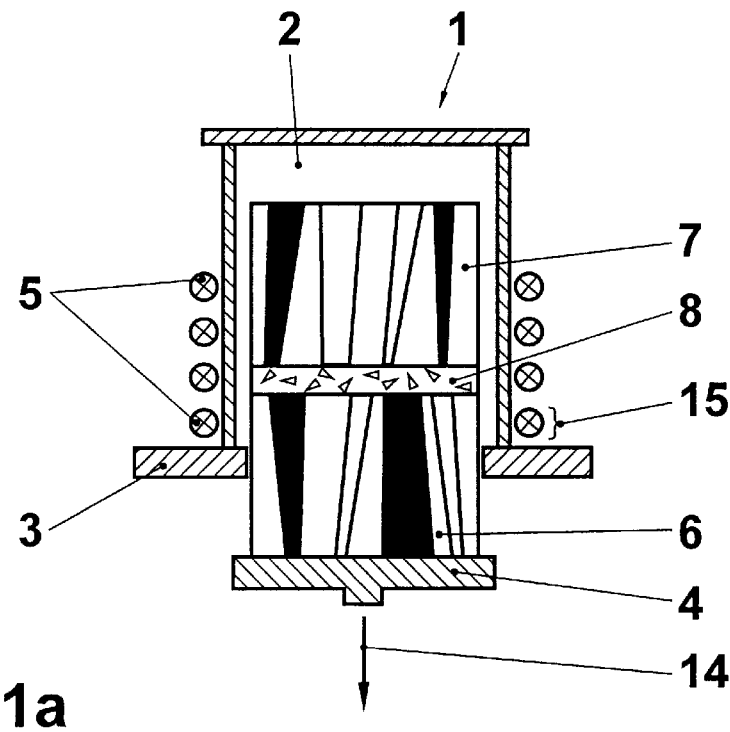
FIG. 1a shows a partial longitudinal section through a brazing apparatus.

Referring now to the drawings, wherein like reference numerals designate identical or corresponding parts throughout the several views and only the elements essential for understanding the invention are shown, FIG. 1a shows a brazing apparatus 1, which essentially comprises a closed-off chamber 2, a baffle 3 for the heat insulation, a plate 4, and at least one heating device 5. An inductive heating system is used here as the heating device 5, but other heating systems may also be used. A directionally solidified component 6 is put onto the plate 4. A solid layer of a brazing alloy 8 essentially corresponding to the component 6 is put onto this component 6, and a directionally solidified component 7 is again put onto the brazing alloy 8.

The brazing alloy consists, for example, of the parent material of the part to be repaired and of an addition of one or more elements which reduce the melting point. Boron, silicon, etc., or a combination of these elements, may be used for example as the element which reduces the melting point.

The three components are inserted into the chamber 2 from below through an opening in the baffle 3, so that at least the top part of the bottom directionally solidified component 6 projects into the chamber 2.

Heat energy is fed into the components 6, 7 and 8 by the inductive heating system 5. The heating system produces a clearly defined region 15 through which the components and the brazing deposit can be moved in the direction of an arrow 14. In this zone 15, the temperature produced by the heating system 5 is now selected in such a way that it is greater than the liquidus temperature of the brazing alloy 8 but less than the local incipient melting temperature of the directionally solidified component 6. A thermal gradient is produced in the direction of the plate 4 by the components 6, 7 and the brazing deposit 8. At the boundary layer between the component 6 and the brazing deposit 8, that surface of the component 6 which faces the brazing deposit serves as a nucleating agent for the molten brazing deposit. If the molten brazing deposit is moved out of the zone 15, the temperature falls below the liquidus temperature. The orientation of the grains of the component 6 is passed to the brazing alloy when the brazing alloy solidifies. Directional solidification is produced in the brazing deposit by the thermal gradient in the direction of the plate 4.

The plate 4 may be actively cooled, for example by feeding cold water. The thermal gradient is thereby increased in the direction of the plate 4. The heating zone 15 may therefore also be selected to be larger, as a result of which effects due to the size of the heating zone are reduced.

Figure 1B:
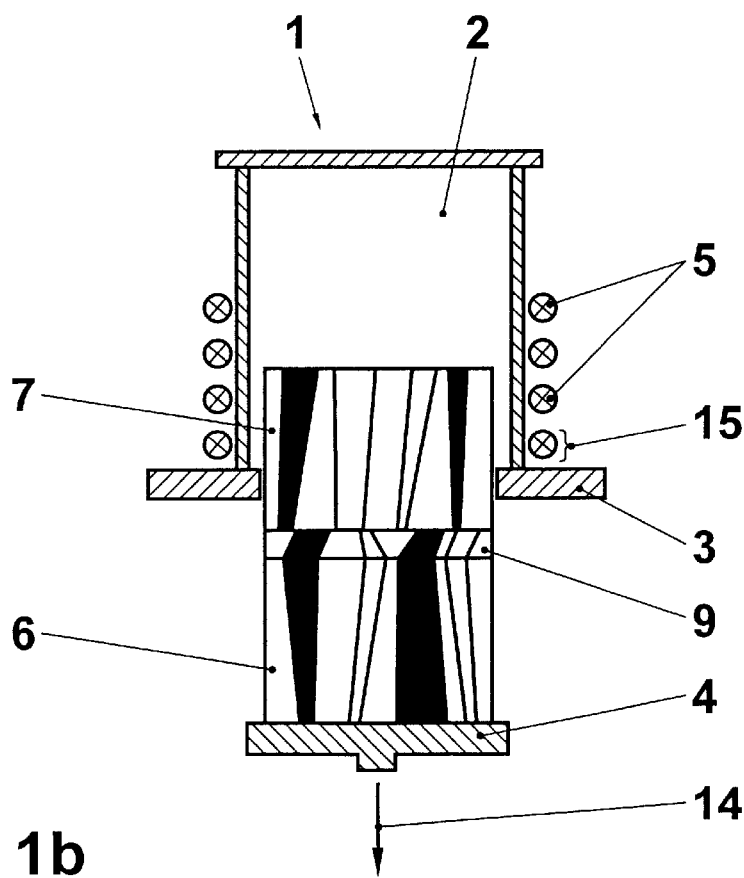
FIG. 1b shows a further partial longitudinal section through the brazing apparatus.

According to FIG. 1b, the solidified brazing alloy 9 has essentially the same directionally solidified structure as the parent material of the components 6, 7. In addition, the strength of the brazed joint is comparable with that of the components 6, 7.

Figure 2:
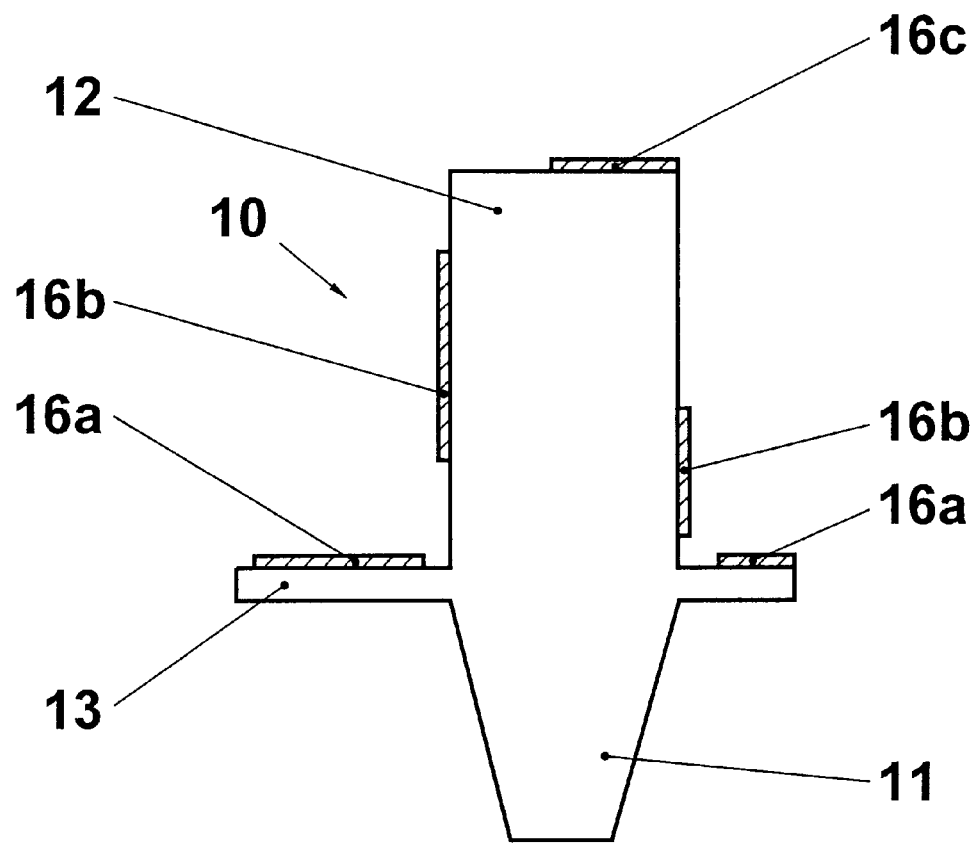
FIG. 2 shows a partial longitudinal section through a blade repaired by brazing.

FIG. 2 shows a directionally solidified or monocrystalline blade 10, essentially comprising a blade root 11, a blade body 12 and a platform 13, to which brazing alloys have been applied at various points—16a on the platform, 16b on the blade body and 16c on the blade tip. This is essentially done with the same method as described above.

Figure 3:
FIG. 3 shows a micrograph through a partly directionally solidified brazing alloy, magnification 50x.
Figure 4:
FIG. 4 shows an enlarged detail of FIG. 3, magnification 100x.

FIGS. 3 and 4 show different enlarged micrographs through a brazing alloy solidified according to the invention. Partly directionally solidified grains in the brazing alloy can be clearly seen.

The invention is of course not restricted to the exemplary embodiment shown and described. Monocrystalline components may also be used instead of the directionally solidified components.

Obviously, numerous modifications and variations of the present invention are possible in light of the above teachings. It is therefore to be understood that, within the scope of the appended claims, the invention may be practiced otherwise than as specifically described herein.

What is claimed:

1. A method of brazing directionally solidified or monocrystalline components comprising steps of: moving a directionally solidified or monocrystalline component having a brazing alloy deposit thereon through a heated zone of a heating system so as to heat the brazing alloy deposit above the liquidus temperature of the brazing alloy but below the local incipient melting temperature of the component and provide a thermal gradient between the component and the brazing alloy deposit; and cooling the molten brazing alloy deposit so as to effect directional solidification of the molten brazing alloy deposit.

2. The method as claimed in claim 1, wherein two components are joined by means of the brazing alloy deposit.

3. The method as claimed in claim 1, wherein the brazing alloy deposit is applied to a single component.

4. The method as claimed in claim 3, wherein the component is a blade.

5. The method as claimed in claim 1, wherein the brazing alloy deposit includes B and/or Si.

6. The method as claimed in claim 1, wherein the component includes a nucleating surface in contact with the brazing alloy deposit, the nucleating surface orienting grains of the brazing alloy deposit during the directional solidification of the brazing alloy deposit.

7. The method as claimed in claim 1, wherein the thermal gradient provides decreasing temperatures in a direction extending from the brazing alloy deposit into the component.

8. The method as claimed in claim 1, wherein the component comprises a turbine blade having a blade root, a blade body and a platform, the brazing alloy deposit being located on one or more surfaces of the blade root, the blade body and/or the platform.

9. The method as claimed in claim 1, wherein the component has a monocrystalline microstructure.

10. The method as claimed in claim 1, wherein the heating system includes a chamber wherein the component and the brazing alloy deposit are heated, a baffle having an opening through which the component and the brazing alloy deposit move out of the chamber, and a water cooled plate supporting the component, the plate being moved such that the brazing alloy deposit moves through the heating zone while the component moves through the opening.

11. The method as claimed in claim 1, wherein the brazing alloy deposit comprises a material having the same composition as that of the component, the brazing alloy deposit further including sufficient boron and/or silicon to lower the melting point thereof.

12. The method as claimed in claim 1, wherein the brazing alloy deposit is melted in the heated zone and the cooling forms directionally solidified grains in the brazing alloy deposit.

* * * * *